US011881329B2

(12) United States Patent
Rogers

(10) Patent No.: US 11,881,329 B2
(45) Date of Patent: Jan. 23, 2024

(54) METHOD OF MANUFACTURING FIRE RESISTANT COAXIAL CABLE FOR DISTRIBUTED ANTENNA SYSTEMS

(71) Applicant: American Fire Wire, Inc., Minden, NV (US)

(72) Inventor: William E. Rogers, Danville, CA (US)

(73) Assignee: American Fire Wire, Inc., Minden, NV (US)

( * ) Notice: Subject to any disclaimer, the term of this patent is extended or adjusted under 35 U.S.C. 154(b) by 488 days.

(21) Appl. No.: 16/895,844

(22) Filed: Jun. 8, 2020

(65) Prior Publication Data

US 2021/0183539 A1 Jun. 17, 2021

Related U.S. Application Data

(62) Division of application No. 16/714,553, filed on Dec. 13, 2019, now Pat. No. 10,726,974.

(51) Int. Cl.
*H01B 13/26* (2006.01)
*H01B 7/18* (2006.01)
(Continued)

(52) U.S. Cl.
CPC ....... *H01B 13/2606* (2013.01); *H01B 7/1865* (2013.01); *H01B 7/295* (2013.01); (Continued)

(58) Field of Classification Search
CPC .............. H01B 13/016; H01B 13/0162; H01B 13/2606; H01B 7/1865; H01B 7/295; H01B 3/28; H01B 3/46; H01B 11/1813
See application file for complete search history.

(56) References Cited

U.S. PATENT DOCUMENTS 3,299,202 A 1/1967 Brown
3,567,846 A 3/1971 Brorein et al.
(Continued)

FOREIGN PATENT DOCUMENTS

CN 201421874 3/2010
CN 202384468 8/2012
(Continued)

OTHER PUBLICATIONS

E. H. Johnson, "Foam Heliax—A new foam coaxial cable," in IRE Transactions on Vehicular Communications, vol. VC-11, No. 1 , pp. 1-3, Aug. 1962. (Year: 1962).*
(Continued)

*Primary Examiner* — A. Dexter Tugbang
(74) *Attorney, Agent, or Firm* — Mark P. Mathison

(57) ABSTRACT

A fire resistant coaxial cable and method of making is described that has a 2-part dielectric made of a polymer foam and a ceramifiable silicone rubber. The polymer foam, which can be polypropylene or other polymers, leaves little-to-no residue in the cable that causes electromagnetic loss when upon burning. The polymer foam can be extruded over a center conductor using an inert gas, such as nitrogen, to propagate the foam, ensuring little-to-no residue in the cable. The ceramifiable silicone rubber can be extruded over the polymer foam. The ceramifiable silicone rubber can have a polysiloxane matrix with inorganic flux and refractory particles that ceramify under high heat, such as temperatures specified by common fire test standards (e.g., 1850° F./1010° C. for two hours). The cable is configured to maintain a relatively coaxial relation between a center conductor and an outer conductor even under aforementioned fire tests. Another layer of ceramifiable silicone rubber surrounds the outer conductor and continues to insulate it from the outside if a low-smoke zero-halogen (LSZH) jacket burns away.

17 Claims, 10 Drawing Sheets

(51) Int. Cl.

| | |
|---|---|
| ***H01B 7/295*** | (2006.01) |
| ***H01B 11/18*** | (2006.01) |
| ***H01B 13/016*** | (2006.01) |
| *H01B 3/46* | (2006.01) |
| *H01B 3/28* | (2006.01) |

(52) U.S. Cl.

CPC ....... *H01B 11/1813* (2013.01); *H01B 13/016* (2013.01); *H01B 13/0162* (2013.01); *H01B 3/28* (2013.01); *H01B 3/46* (2013.01)

(56) References Cited

U.S. PATENT DOCUMENTS

| | | | |
|---|---|---|---|
| 3,590,141 A | 6/1971 | Mildner | |
| 3,823,255 A | 7/1974 | La Gase et al. | |
| 3,903,354 A | 9/1975 | Dageforde | |
| 4,391,425 A | 7/1983 | Keep, Jr. | |
| 5,227,586 A | 7/1993 | Beauchamp | |
| 5,262,593 A | 11/1993 | Madry et al. | |
| 5,457,285 A | 10/1995 | Faust et al. | |
| 5,714,421 A | 2/1998 | Olds et al. | |
| 6,049,647 A | 4/2000 | Register et al. | |
| 6,387,518 B1 | 5/2002 | Wolfer et al. | |
| 7,304,245 B2 | 12/2007 | Alexander et al. | |
| 7,470,641 B2 | 12/2008 | Jubb et al. | |
| 7,538,275 B2 | 5/2009 | Konnik et al. | |
| 7,652,090 B2 | 1/2010 | Alexander et al. | |
| 7,875,566 B2 | 1/2011 | Freeman et al. | |
| 9,449,741 B2 | 9/2016 | Abe et al. | |
| 9,450,352 B2 | 9/2016 | Miyawaki | |
| 9,773,585 B1 | 9/2017 | Rogers | |
| 10,283,239 B2 | 5/2019 | Rogers | |
| 10,726,974 B1 | 7/2020 | Rogers | |
| 11,145,440 B2 | 10/2021 | Rogers | |
| 2003/0055157 A1 | 3/2003 | Wolfer et al. | |
| 2006/0175074 A1 | 8/2006 | Huffman | |
| 2008/0093107 A1 | 4/2008 | Amigouet et al. | |
| 2010/0101824 A1 | 4/2010 | Fujimoto et al. | |
| 2011/0209892 A1 | 9/2011 | Metz et al. | |
| 2011/0247839 A1 | 10/2011 | Lalouch et al. | |
| 2013/0299211 A1 | 11/2013 | Pope | |
| 2014/0037956 A1 | 2/2014 | Sopory | |
| 2015/0060106 A1 | 3/2015 | Polasky | |
| 2015/0206625 A1 | 7/2015 | Kumada | |
| 2015/0318675 A1* | 11/2015 | Olsson ............... | H01B 13/0162 29/825 |
| 2016/0093419 A1 | 3/2016 | Shin et al. | |
| 2018/0174710 A1 | 6/2018 | Rogers | |
| 2020/0126690 A1 | 4/2020 | Sirin et al. | |
| 2020/0211739 A1 | 7/2020 | Elsaadani et al. | |
| 2021/0233682 A1 | 7/2021 | Elsaadani et al. | |

FOREIGN PATENT DOCUMENTS

| | | |
|---|---|---|
| CN | 103753927 | 4/2014 |
| CN | 105913951 | 8/2016 |
| CN | 107768003 | 3/2018 |
| JP | 11297128 | 10/1999 |
| JP | 2012204089 A * | 10/2012 |

OTHER PUBLICATIONS

"2-Hour Fire-Rated, Mineral Insulated Copper Sheathed Wiring Cable", Pentair, Pyrotenax System 1850, Jul. 2015, 6 pages.

"3M™ Nextel™ Ceramic Fibers and Textiles", 3M Science Applied to Life, Available at http://www.3m.com/3M/en-US/company-us/a11-3m-products/-/A11-3M-Products/Chemicals-Advanced-Materials/Advanced-Ceramics/Ceramic-Fibers-and-Textiles, Nov. 9, 2016, 11 pages.

"Alsecure® Premium Multicore", Nexans Olex, Alsecure® Premium Multicore Ceramifiable®, Available at http://www.olex.com.au, Nov. 19, 2016, 2 pages.

"Ceram Polimerik—The World's Hottest Company in Fire Protection Technology", Global Intelligence of Fire Protection Industry Worldwide, Market Analysis of Projects and Developments, Fire Prevention—Active and Passive Fire Protection, Press Room Available at http://hkc22.com/fireprotectionindustry_pressroom_ceram_polymerik.html, Accessed from Internet on Nov. 18, 2016, 3 pages.

"Ceramifiable Silicone Rubber Compound for Fire Resistant Cable", Anpin Silicone Material Co., Ltd., Available at http://anpin.en.explaza.net/ceramifiable-silicone-rubber-compund-for-94686-3590090.html, Accessed from Internet on Sep. 26, 2016, 3 pages.

"Fire-Resistant Cables", Fanton, 2007-2008, 1 page.

"Korean Ceramifiable® Cables That Can Take the Heat", Nexans, Available at http://www.nexans.com/eservice/navigation/NavigationPublicationOnly.nx?forPrint=true&publicationld=-33641, Accessed from Internet on Nov. 18, 2016, 1 page.

Di et al., "A Novel EVA Composite With Simultaneous Flame Retardation and Ceramifiable Capacity", RSC Advances, vol. 5, Issue 83, 2015, 2 pages.

Wilson et al., "Circuit Integrity Cable Re-Examined", Available Online At: http://www.csemag.com/industry-new/codes-and-standards-updates/single-article/circuit-integrity-cable-reexamined/09dde6e6e9f8cc2e5c90c024f3825d3b.html, Mar. 1, 2002, 2 pages.

* cited by examiner

METHOD OF MANUFACTURING FIRE RESISTANT COAXIAL CABLE FOR DISTRIBUTED ANTENNA SYSTEMS

CROSS-REFERENCES TO RELATED APPLICATIONS

This is a divisional application of U.S. patent application Ser. No. 16/714,553, filed Dec. 13, 2019, which is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present application generally relates to communication cables or conductors, including coaxial cables constructed with cellular and other structure between the conductors. Specifically, the application is related to fire-resistant coaxial cables with a 2-part dielectric between the center conductor and outer shell: foamed (cellular) polymer and ceramifiable silicone rubber.

2. Description of the Related Art

Since the Sep. 11, 2001 attacks on the World Trade Center and Pentagon, there has been a world-wide emphasis on improving communications during emergencies. In the first minutes of an emergency, communication among civilians and first responders is often through wireless communication devices, such as cellular telephones. While wireless signals, being electromagnetic radiation typically in the radio frequency (RF) range, are impervious to damage and do not depend on wires for transmission, the wireless signals depend on other infrastructure to communicate. This infrastructure includes antennas, switching equipment, towers, repeaters—and wires.

Ground zero of a disaster, man-made or natural, is often localized to a particular geographic area. At least some local cell towers may be operational. But cell phones within large buildings often do not connect directly with cell towers. Such buildings, as well as shopping centers and stadiums, may have too many obstacles and reflections for conventional cell phone-to-tower connections. For example, the metal reflective film applied to glass facades of commercial buildings prevents transmission of RF energy outside the building. Or the buildings may simply be too large for RF signals to reach a nearby cell tower, such as is the case with stadiums.

A cellular distributed antenna system (DAS) is often employed within buildings and other facilities in order to facilitate transmission of signals between occupants' cell phones and local cell towers. Multiple antennas are located throughout the facility, such as on each floor. Signals to and from the distributed antennas are routed—by cable—through a central processing rack in the basement or on the first or top floor. One or more cables connects the central processing rack to an outside antenna that is pointed or otherwise configured to optimally communicate with a local cell tower. The outside antenna is often located on a building's roof.

An Emergency Responder Radio Coverage System (ERRCS) DAS may also be employed within facilities. An ERRCS DAS boosts radio signals for firemen, policemen, and other first responders, similarly to a cellular DAS.

If there is an emergency in the building, a DAS may be critical for communications. Firefighters and policemen need to communicate with one another while responding. Users should be able to communicate with the outside as well. It may be especially unnerving for users to have their otherwise-normally-operational cell phones experience an outage during a building emergency.

It is for these and other reasons that building fire codes require DASes to meet certain survivability standards. For example, building fire codes sometimes dictate that communication cables connecting the DAS's antennas to the central processing/head-end rack and communication cables running from the rack to the outside antenna maintain operation at 1010° C. (1850° F.) temperatures for two hours. This standard can be found among the NFPA 72 (National Fire Alarm and Signaling Code), ICC IFC 510 (International Fire Code), and NFPA 1221 (Standard for the Installation, Maintenance, and Use of Emergency Services Communications Systems) codes.

Fire resistant coaxial cables have been explored previously, although methods to make the cable fire resistant are potentially subject to dielectric loss in day-to-day operation. As several building codes require the use of cables outfitted to withstand the intense heat of a fire, the everyday demands of various fast moving industries require a compliant cable that minimizes signal loss.

There is a need in the art for a cable that is survivable with minimal signal loss.

BRIEF SUMMARY

Generally, a coaxial cable is described with a foam+ceramifiable silicone rubber dielectric layer between an inner, center conductor and a coaxial, outer conductor. When subjected to temperatures exceeding 1010° C. (1850° F.), the ceramifiable silicone ceramifies to provide structural integrity. Thus, even in the event of the foam dielectric burning away at temperatures exceeding 1010° C. (1850° F.), the ceramifiable silicone maintains the center conductor relatively coaxial to the outer conductor.

Some embodiments of the invention are related to a fire resistant coaxial cable apparatus including a center conductor, a foam dielectric layer of polymer surrounding the center conductor, a ceramifiable silicone dielectric layer of ceramifiable silicone rubber surrounding the foam dielectric layer, the ceramifiable silicone rubber comprising inorganic flux particles and refractory particles in a polysiloxane matrix, the ceramifiable silicone rubber configured to convert from a resilient elastomer to a porous ceramic when heated above 1010° C. or other temperature, an outer conductor surrounding the ceramifiable silicone dielectric layer, and a ceramifiable silicone jacket layer, or ceramifiable silicone rubber surrounding the outer conductor. The ceramifiable silicone rubber that surrounds what is otherwise known as the foam dielectric layer can itself be foamed or unfoamed.

The foam dielectric layer of polymer surrounding the center conductor can directly touch the center conductor.

The ceramifiable silicone dielectric layer can have a thickness of at least 50% of a thickness of the foam dielectric layer. An example thickness of the ceramifiable silicone dielectric layer is 55% to 60% of the foam dielectric layer.

The foam dielectric layer can have an outer diameter of 11.7 millimeters (0.460 inches), and the ceramifiable silicone dielectric layer can have an outer diameter of about 15.2 millimeters±0.51 millimeters (0.600 inches±0.020 inches). This makes for a total dielectric thickness of 10.04 millimeters±0.51 millimeters (0.395 inches±0.020 inches).

The ceramifiable silicone dielectric layer can have a thickness greater than 33% of the combined thickness of all the layers between the center conductor and the outer conductor, whereby, in an event where the foam dielectric layer burns away and no longer supports the center conductor, the ceramifiable silicone dielectric keeps the center conductor within 67% of the center.

The apparatus can use a polymer foam that entraps no carbon monoxide, carbon dioxide, or ammonia residue from manufacturing. These are the common products of chemical foaming agents. The apparatus can use a polymer foam that entraps no residue left from the decomposition of azodicarbonamide (ADCA), 4,40-oxybix (benzenesulfonylhydrazide) (OBSH), and/or zinc stearate, zinc oxide, naphthenate, urea, or benozate.

The foam dielectric layer can be selected from the group consisting of polypropylene, polyethylene, polytetrafluoroethylene, and fluorinated ethylene propylene. The ceramifiable silicone dielectric layer can be in direct contact with the foam dielectric layer.

A plastic film can be between the ceramifiable silicone dielectric and the outer conductor.

The outer conductor can include a metal foil and a metal braid surrounding and be in electrical contact with the metal foil. Alternatively, the outer conductor can include a corrugated metal.

A plastic sheath can be between the metal braid of the outer conductor and the ceramifiable silicone jacket layer.

A low smoke zero halogen (LSZH) outer jacket can surround the ceramifiable silicone jacket layer.

The center conductor can include a single solid wire or multiple wire strands bundled together. The center conductor can have a diameter of 5.16 millimeters (0.203 inches).

When the cable is subject to temperatures above 425° C., the ceramifiable silicone dielectric layer and the ceramifiable silicone jacket layer may ceramify, and a portion of the foam dielectric may have sublimed. The center conductor can rest directly upon an inner surface of the ceramifiable silicone dielectric layer, and the cable can maintain an electrical impedance of 50Ω±6Ω.

Embodiments also include a method of manufacturing a fire resistant coaxial cable, the method including injecting an inert gas into a polymer in order to create a foam polymer, extruding the foam polymer over a center conductor, extruding a layer of ceramifiable silicone rubber over the extruded foam polymer to form a ceramifiable silicone dielectric layer, the ceramifiable silicone rubber comprising inorganic flux particles and refractory particles in a polysiloxane matrix, the ceramifiable silicone rubber configured to convert from a resilient elastomer to a porous ceramic when heated above 1010° C., encasing the ceramifiable silicone dielectric layer with an outer conductor, and extruding a layer of ceramifiable silicone rubber over the outer conductor to form a ceramifiable silicone jacket layer.

The inert gas can be 90% or higher grade pure nitrogen, for example CAS #7727-37-9, which is >99.999% pure $N_2$.

The ceramifiable silicone dielectric layer can be encased with an outer conductor by wrapping a plastic film metalized with metal foil around the ceramifiable silicone dielectric layer and braiding a metal braid around the metal foil.

A plastic sheath can be taped around the metal braid before extruding the layer of ceramifiable silicone rubber over the outer conductor.

Embodiments also include a method of installing a fire resistant coaxial cable, the method including providing a coaxial cable having a center conductor surrounded by a foam dielectric layer of polymer foam, which is surrounded by a ceramifiable silicone dielectric layer of ceramifiable silicone rubber, which is surrounded by an outer conductor, which is surrounded by a ceramifiable silicone jacket layer, which is surrounded by a low smoke zero halogen (LSZH) jacket outer layer, pulling or pushing the coaxial cable through a conduit, and connecting the coaxial cable to an antenna of a distributed antenna system.

Embodiments also include a method of testing a fire resistant coaxial cable, the method including providing a coaxial cable having a center conductor surrounded by a foam dielectric layer of polymer foam, which is surrounded by a ceramifiable silicone dielectric layer of ceramifiable silicone rubber, which is surrounded by an outer conductor, which is surrounded by a ceramifiable silicone jacket layer, which is surrounded by a low smoke zero halogen (LSZH) jacket outer layer, subjecting the coaxial cable to heat at or above 1010° C., ceramifying the ceramifiable silicone dielectric layer or the ceramifiable silicone jacket layer, burning at least apportion of the jacket outer layer from the cable, and passing an electric voltage or current signal through the coaxial cable after the ceramifying and burning.

The ceramifying can include burning away a polysiloxane matrix and melting inorganic flux particles such that the inorganic flux particles connect between refractory filler particles.

The coaxial cable test can be rest on a metal surface, wherein the burning of the jacket outer layer exposes the ceramifiable silicone jacket layer to the metal surface, the ceramifiable silicone jacket preventing the outer conductor from contacting the metal surface.

DETAILED DESCRIPTION

Figure 1A:
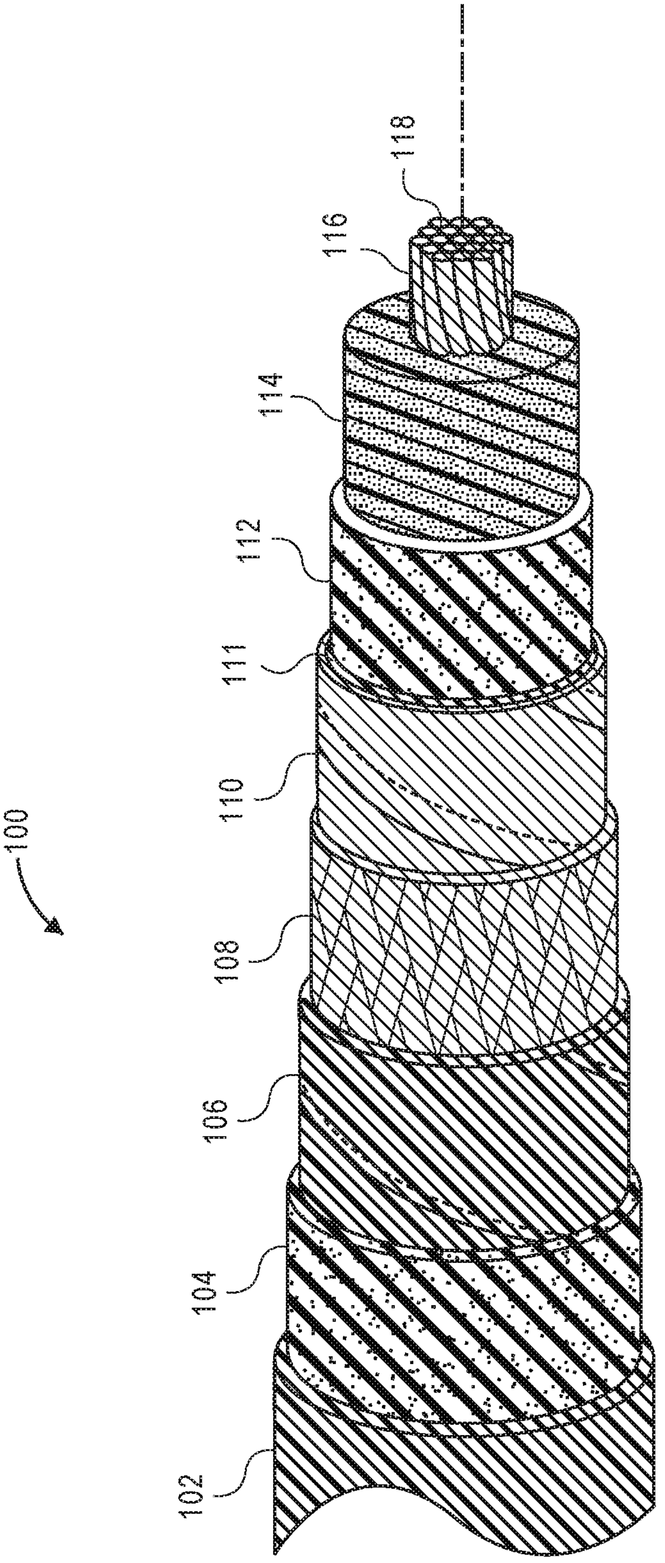
FIG. 1A is a cut-away perspective view of a braided coaxial cable in accordance with an embodiment.

Fire resistant coaxial cable is described. Some embodiments of the cable can survive two hours in fire conditions of 1010° C. (1850° F.), which is a common fire rating, maintaining relative concentricity of a center conductor to allow for operation in an emergency. Use of a two-layered dielectric layer allows a lower dielectric loss in day-to-day operation of the cable, while still ensuring the cable is compliant with building codes for distributed antenna systems (DAS) without the need for fire-protective soffits, conduits or other expensive shielding.

A fire resistant coaxial cable may be large relative to coaxial cables generally available on the market. Chemical expansion of polymer foams at larger scales leaves a small but measurable residue, which impacts signal propagation and performance of the cable. However, the foam dielectric layer can be expanded by a pure-nitrogen foaming process such that little-to-no residue is left within the coaxial cable.

A "ceramifiable" material includes a material that turns from a flexible material into a ceramic when exposed to high temperatures, such as over 425° C., 482° C., 1010° C., or as otherwise known in the art. The material can be a composition of component materials that have different melting ranges. The lowest-melting temperature component materials may melt at 350° C. Between 425° C. and 482° C., other component materials of the material my devitrify, passing from a glass-like state into a crystalline state. Additives can bond refractory fillers together, forming a porous ceramic material. A material configured to convert from a resilient elastomer to a porous ceramic when heated above 425° C. can include initial, partial, or full conversion to ceramic when air temperature surrounding is heated above 425° C.

An example ceramifiable polymer may be the peroxidically crosslinking or condensation-crosslinking polymer described in U.S. Pat. No. 6,387,518.

A "ceramifiable silicone rubber" includes silicone polymer (polysiloxane) with additives that cause the material to turn into a fire-resistant ceramic in high temperature fire conditions, or as otherwise known in the art. This may include peroxide crosslinking or condensation-crosslinking high consistency silicone rubber. A silicone polymer matrix can include low-melting point inorganic flux particles and refractory filler particles in a polysiloxane matrix. Example products include, but are not limited to: Ceramifiable Silicone Rubber Compound RCS-821 manufactured by Shenzhen Anpin Silicone Material Col, Ltd. of Guangdong, China; ELASTOSIL® R 502/75 compound manufactured by Wacker-Chemie GmbH of Munich, Germany; and XIAMETER® RBC-7160-70 compound manufactured by Dow Corning Corporation of Midland, Mich., United States of America.

A "ceramic fiber wrap" includes a textile that includes microscopic ceramic fibers and fillers that maintain structural integrity at high temperatures. Example products include NEXTEL® ceramic fibers and textiles manufactured by 3M Corporation of Saint Paul, Minn., United States of America. 3M NEXTEL® textiles include aluminoborosilicate, aluminosilica, and alumina (aluminum oxide $Al_2O_3$) fibers with diameters ranging from 7 microns to 13 microns. Per the World Health Organization (WHO), fiber diameters above 3 microns (with length greater than 5 microns with a length-to-diameter ration greater than 3:1) are not considered respirable.

A "refractory" material includes non-metallic material having those chemical and physical properties that make them applicable for structures, or as components of systems, that are exposed to environments above 1,000° F. (811 K; 538° C.) (ASTM C71), or as otherwise known in the art.

A "low smoke zero halogen" or "low smoke free of halogen" (LSZH or LSOH or LS0H or LSFH or OHLS) is a material classification typically used for cable jacketing in the wire and cable industry. LSZH cable jacketing is composed of thermoplastic or thermoset compounds that emit limited smoke and no halogen when exposed to high sources of heat.

A "radial thickness" includes a layer thickness, or as otherwise known in the art. On a circular cross-sectioned cable, the radial thickness is the distance along a radial line from one point to another point. This is distinguished from a tangential, secant, axial, or other distance.

A "residue" of an exothermic chemical foaming agent can be small amounts of the foaming agent itself, azodicarbonamide (ADCA), additives such as 4,40-oxybis (benzenesulfonylhydrazide) (OBSH), or activators such as zinc stearate, zinc oxide, naphthenate, urea, or benzoate, or other foaming agent chemicals such as ethylene glycol monobutyl ether, cocmidopropyl hydroxysultaine, glycerol, ethoxylated alcohols, sulfates, sodium salts, and/or diethylene glycol. It can also include products from chemical foaming agent decomposition, such as nitrogen, carbon monoxide, carbon dioxide, and ammonia. If pure nitrogen is used for foaming instead of a chemical foaming agent, then no non-nitrogen residue products of a chemical foaming agent are trapped in the foam pores.

MYLAR® polyester film is trade name of E. I. du Pont de Nemours and Company, Wilmington, Del., U.S.A., for a biaxially-oriented polyethylene terephthalate (boPET) product.

Figure 1B:
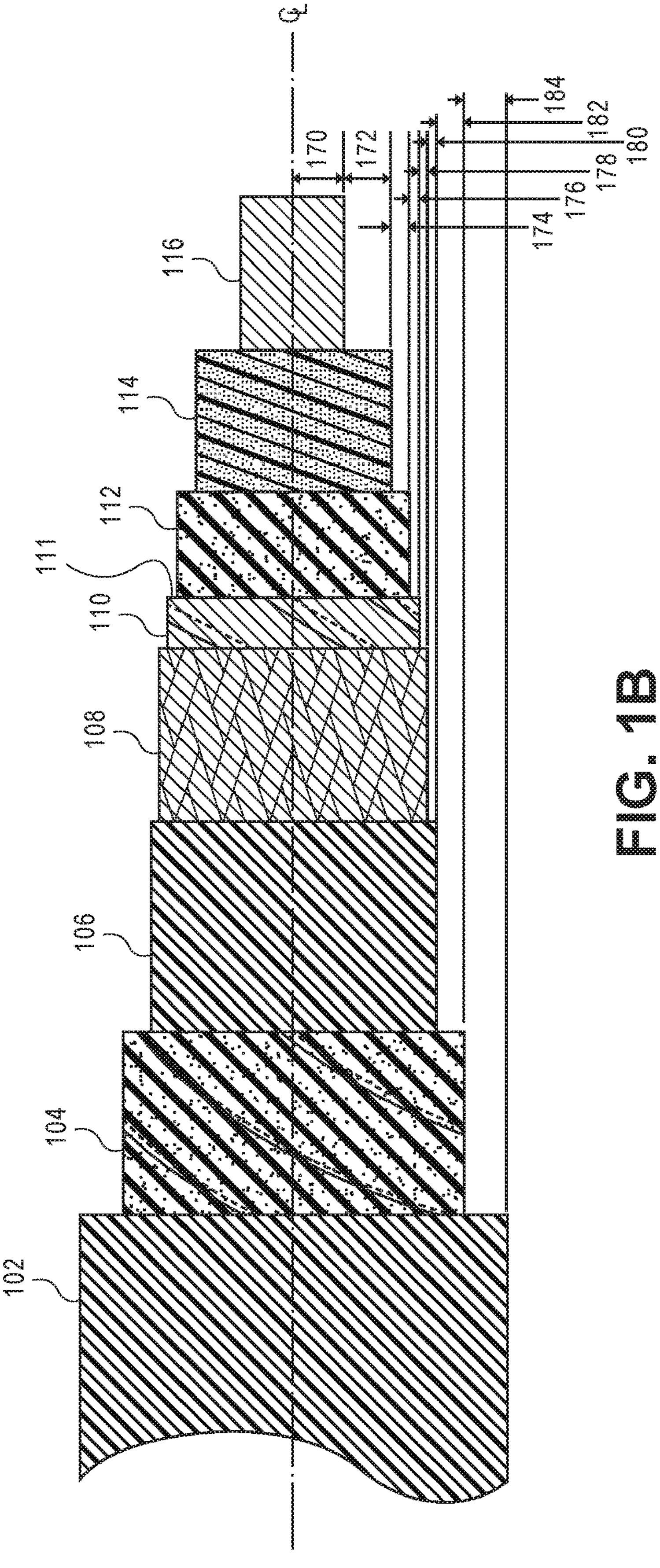
FIG. 1B is a cut-away side view of the braided coaxial cable of FIG. 1A.
Figure 1C:
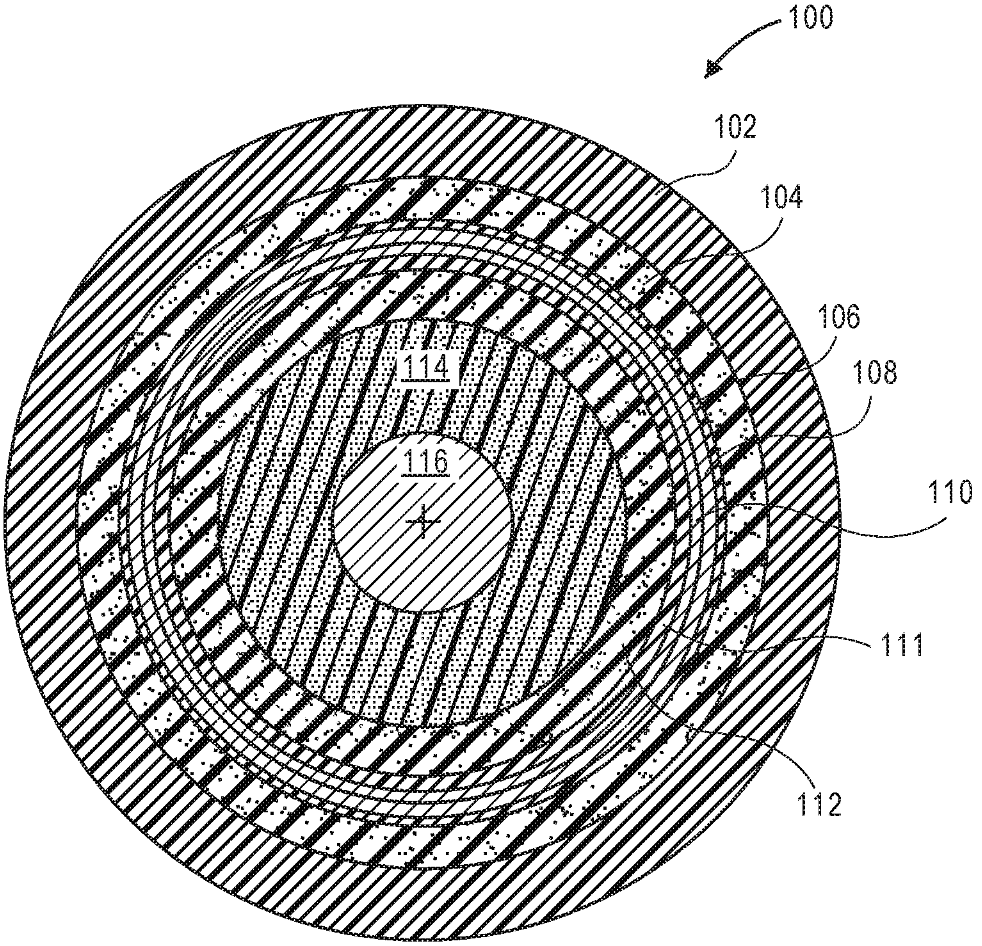
FIG. 1C is a cross-section of the braided coaxial cable of FIG. 1A.

FIGS. 1A-1C illustrate a fire resistant coaxial cable with a 2-part foam/ceramifiable silicone rubber dielectric between a center and an outer conductor. Fire resistant coaxial cable 100 can be run between DAS or other equipment and meet applicable fire codes.

FIG. 1A is a perspective view of a fire resistant coaxial cable 100 that has layers cut away. The exemplary cable essentially has a round cross-section and is radially symmetric around an axial centerline.

Center conductor 116 includes nineteen strands of individual wire 118 that are bundled and twisted together. Each individual wire is bare but can be nickel-plated copper or otherwise modified.

Radially surrounding the center conductor is a polypropylene foam dielectric layer 114 in a cylindrical, tubular form. The foam is closed-cell but may be open-cell. Radially surrounding the polypropylene foam is a ceramifiable silicone rubber dielectric layer 112. The ceramifiable silicone rubber that surrounds what is otherwise known as the foam dielectric layer can itself be foamed or unfoamed. For purposes of this application, the foamed or unfoamed ceramifiable silicone dielectric rubber layer will be referred to as a ceramifiable silicone rubber dielectric layer. The polypropylene foam dielectric layer 114 and ceramifiable silicone rubber dielectric layer 112 together form an overall dielectric layer of the coaxial cable. Center conductor 116 is symmetrically centered in the dielectric.

The polypropylene foam dielectric layer 114 can be extruded and foamed using an inert gas, such as nitrogen gas. The extrusion by an inert gas ensures that no unwanted chemical residue gets trapped in the polypropylene foam. The presence of some residues can negatively impact the signal loss throughout the coaxial cable 100.

The polypropylene foam dielectric layer 114 can be made of other polymer foams, including polyethylene, polytetrafluroethylene, and fluorinated ethylene propylene. These alternative polymer foams can also be extruded and foamed using an inert gas to ensure that no unwanted chemical residue is trapped within the polymer foam layer. For example, using pure nitrogen to foam the polymer avoids residues that chemical agents leave.

Ceramifiable silicone rubber dielectric layer 112 is wrapped with a copper MYLAR® flexible film tape, with a 25% nominal overlap. The metallized tape has a copper side 110 facing outwards from the flexible film tape substrate 111. Other overlaps and conductor materials may be used.

For example, aluminum or other metal foil may be used, which may not have a polymer film attached. The overlap may be 1%, 2%, 5%, 10%, 15%, 20%, 25%, 30%, 35%, 40%, 45%, 50%, 55%, 60%, 65%, 70%, 75%, or other percentages of overlap.

Copper braiding 108 surrounds and is in direct contact with the copper side 110 of the metallized tape. The braiding includes 32 AWG (American Wire Gauge) tin-plated copper woven in a continuous fashion at a coverage of at least 85%. Other embodiments may use other types of metallic braiding at different coverage percentages. The copper side 110 and copper braiding 108 together serve as an outer conductor of the coaxial cable 100.

For example, a silver-plated braiding, or alternative metal braiding, may be used. In other embodiments, the coverage percentage may be 50%, 55%, 60%, 65%, 70%, 75%, 80%, 90%, 95%, 100%, or other percentage of coverage.

Alternatively, the metal braid and copper layer may be a corrugated metal, such as a 0.25 inch solid copper corrugated metal, or other corrugated metal.

A plastic sheath layer 106 surrounds the copper braiding 108. The plastic sheath layer 106 is a MYLAR® flexible film with 10% nominal overlap. Other overlaps and plastic sheaths may be used.

For example, an alternative biaxially-oriented polyethylene terephthalate (BoPET) or alternative polyester film can surround the copper braiding. The film may have an overlap of 1%, 2%, 5%, 10%, 15%, 20%, 25%, 30%, 35%, 40%, 45%, 50%, 55%, 60%, 65%, 70%, 75%, or other percentages of overlap.

Inner jacket layer 104 surrounds the plastic sheath layer 106. Inner jacket layer 104 is another layer of ceramifiable silicone rubber, which encloses plastic sheath layer 106 in a fire resistant shell. Plastic sheath 106 prevents inner jacket layer 104 from embedding itself into the copper braiding 108 while extruding.

In some embodiments, the ceramifiable silicone rubber dielectric can be replaced by ceramic fiber wrap material. A ceramic fiber wrap can be in direct contact with and surround a metal braid. It can be woven continuously around the outer conductor such that it completely covers the outer conductor Outer jacket 102 surrounds inner jacket layer 104. Outer jacket 102 is a low-smoke zero halogen jacket (LSZH), which protects the pliable silicone rubber of the inner jacket and slides more easily through walls and conduits. The outer jacket can be made of cross-linked, irradiated polyolefin and can be colored in order to stand out from other non-emergency cables. Other materials can be used for an outer jacket.

Other examples of outer jacket material include polyvinyl chloride (PVC), thermoplastic elastomers, thermoset polyolefins, or other cable jacketing materials.

Example dimensions of a coaxial cable are shown in the following tables. These dimensions and materials are not limiting.

TABLE 1

5/19 Foamed Poly/Solid CF Silicone Fire Cable

| Structure Type | Layer Thickness | Outer Diameter | Material |
|---|---|---|---|
| Center conductor | | 5.16 mm (0.203 in.) | 5(19) bare copper, 19 strands of 1.02 mm (0.0403 inches) diameter each |
| Inner Dielectric | 3.28 mm (0.129 in.) | 11.7 mm (0.460 in.) | foamed polypropylene |
| Outer Dielectric | 1.9 mm (0.075 in.) | 15.2 ± 0.51 mm (0.600 ± 0.020 in.) | ceramic forming silicone rubber (foamed or unfoamed) |
| Tape | | 15.5 mm (0.610 in.) | copper MYLAR ® flexible film tape (25% nominal lap, copper side up) |
| Shield | | 16.3 mm (0.640 in.) | 32 AWG tin plated copper braid, 85% min. coverage |
| Separator Tape | | 16.4 mm (0.645 in.) | MYLAR ® flexible film 10% nominal lap |
| Jacket Inner Layer | 1.33 mm (0.0525 in.) | 19.0 mm (0.750 in.) | ceramic forming silicone rubber |
| Jacket Outer Layer | 1.91 mm (0.075 in.) | 22.9 ± 0.76 mm (0.900 ± 0.030 in.) | low smoke zero halogen (LSZH), cross-link irradiated polyolefin |

FIG. 1B shows radial thickness dimensions, some of which are shown in Table 1. Central conductor radius 170 is the radius of center conductor 116. Polypropylene foam layer thickness 172 is the thickness of polypropylene foam layer 114. Ceramifiable silicone rubber layer thickness 174 is the thickness of ceramifiable silicone rubber layer 112. Together, thicknesses 172 and 174 are the dielectric layer thickness.

In different embodiments, dielectric layer thickness can change based on the dielectric material being used and the size of the cable, to obtain a desired effective dielectric constant and relative magnetic permeability of the insulator. The above dimensions give an example of a desired effective dielectric constant for the use of a polypropylene foam, for a specific use case. However, the ratio of the thicknesses may change if, for example, a polyethylene foam were used, and a lower or higher dielectric constant was desired.

Metallized tape layer thickness 176 is the total thickness of the copper side 110 atop flexible film tape substrate 111. Copper braid thickness 178 is the thickness of copper braid 108. Plastic sheath thickness 180 is the thickness of plastic sheath layer 106. Inner jacket thickness 182 is the thickness of inner jacket layer 104. Outer jacket thickness 184 is the thickness of outer jacket layer 102.

With the exemplary measurements in Table 1, the ceramifiable silicone dielectric layer 112 has a thickness 174 of about 58% of the polypropylene foam layer thickness 172. With a thickness 174 of 58% of polypropylene foam layer thickness 172, the ceramifiable silicone dielectric layer 112 can serve as a temporary heat barrier for the propylene foam dielectric layer 114 before the propylene foam dielectric layer 114 would vaporize. The temporary heat barrier gives a longer period of time for which the ceramifiable silicone dielectric layer 112 to ceramify into a round shape, maintaining concentricity of the center conductor 116, relative to an outer conductor.

Embodiments of the invention, however, can use thicknesses of 50% of the polypropylene foam layer thickness. For example, with the polypropylene foam thickness of 3.28 mm (0.129 in.) in Table 1, a ceramifiable silicone dielectric layer can have a thickness of 1.64 mm (0.065 in.). In such embodiments, it may be desirable to use a lesser amount of ceramifiable silicone rubber relative to the polypropylene foam, to either obtain a smaller cable or to reduce costs of ceramifiable silicone rubber material. In other embodiments, more ceramifiable silicone rubber may be desired relative to the propylene foam in order to maintain a tighter tolerance of performance as well as a greater spacing between the center conductor and outer conductor in the event of fire. For example, with the same polypropylene foam thickness of Table 1, the ceramifiable silicone rubber can have a thickness of as great as 65%, or 2.13 mm (0.083 in.).

The ceramifiable silicone dielectric layer 112 has a thickness 174 of greater than 33% of the combined layers between the inner conductor 116 and the outer conductor, composed of copper side 110 and copper braiding 108. In other words, the ceramifiable silicone dielectric layer thickness 174 is 35% of the combined radial thicknesses of polypropylene foam dielectric layer 172, ceramifiable silicone dielectric layer 174, and flexible film tape substrate 176. With a radial thickness of 35% of the combined layers, the ceramifiable silicone dielectric layer 112 ceramifies while maintaining center conductor 116 within 65% of the center of coaxial cable 100. Maintaining this distance ensures a tolerance wherein center conductor 116 can still propagate signal even in the absence of a polypropylene foam dielectric layer 114 directly in contact with center conductor 116.

Embodiments of the invention can have the thickness of the ceramifiable silicone dielectric in the range of 25% to 50% of the thickness between the inner conductor and the outer conductor. For example, with similar measurements as described in Table 1, for a polypropylene foam dielectric layer with 3.28 mm (0.129 in.) of radial thickness and a flexible film substrate thickness of 0.15 mm (0.006 in.), the ceramifiable silicone rubber can span the range of 1.14 mm (0.044 in.) to 3.43 mm (0.135 in.).

The amount of ceramifiable silicone rubber can help maintain a differing relative coaxial relation between the center conductor and the outer conductor. For example, in situations where a tighter tolerance is needed, such as cables running a longer length, a higher amount of ceramifiable silicone can be used, such that the slump over the entire length of cable is still operational in the event of fire. In other uses, such as situations where a shorter cable is desired, a smaller amount of ceramifiable silicone can be to minimize dielectric loss.

Figure 2:
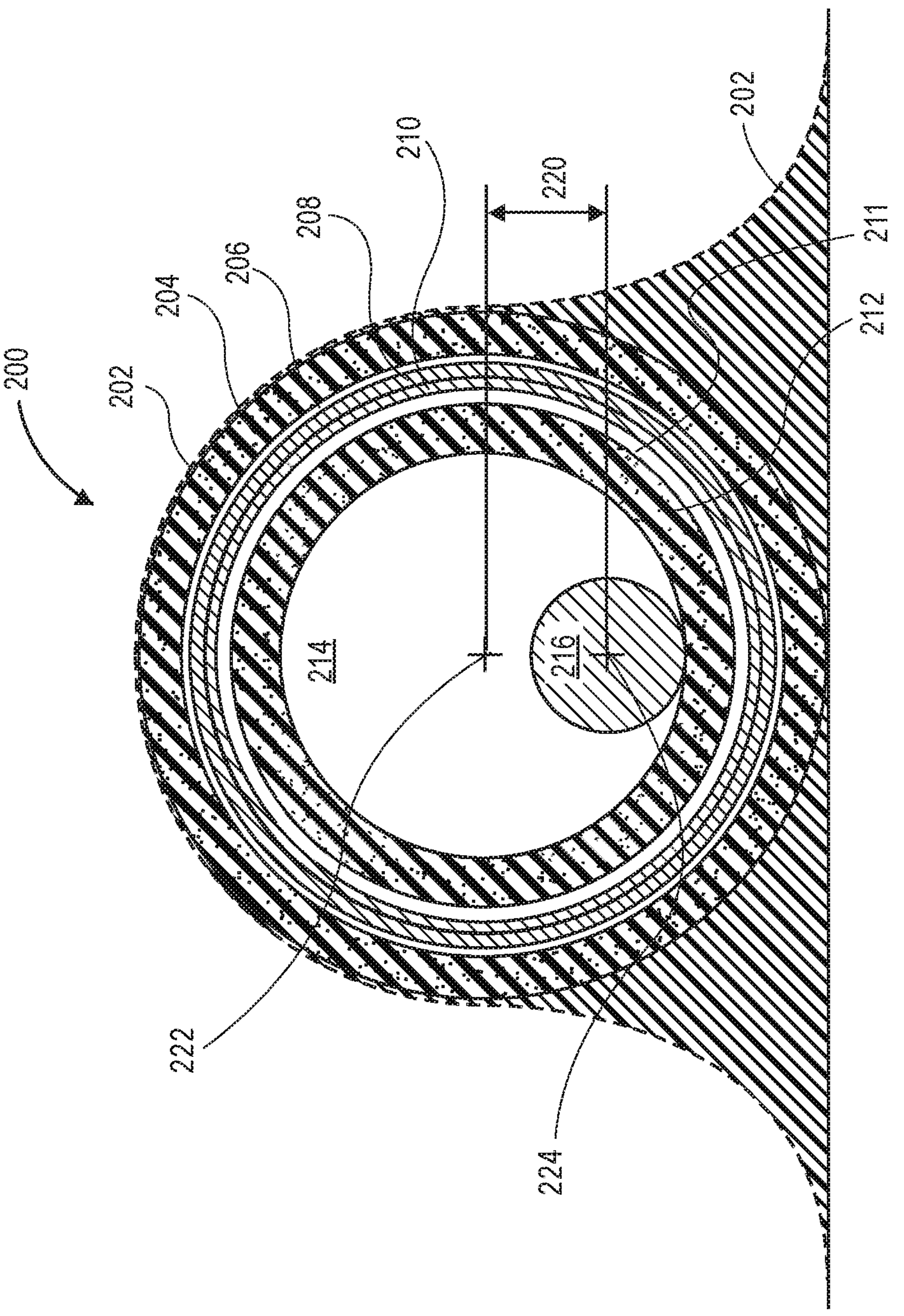
FIG. 2 is a cross-section of a braided coaxial cable after exposure to heat at or above 1010° C. in accordance with an embodiment.

FIG. 2 is a cross-sectional view of a fire resistant coaxial cable 200 after being exposed to temperatures over 1010° C. Ceramifiable silicone rubber in inner jacket layer 204 and ceramifiable silicone rubber dielectric layer 212 have ceramified and form a brittle, porous structure. Outer jacket layer 202, represented with dotted lines, is the remaining material after a more substantial jacked has melted away. Its loss exposes inner jacket layer 204 as, effectively, the outermost layer. Plastic sheath layer 206, flexible film tape substrate 211, and polypropylene foam dielectric layer 214 have burned away leaving empty spaces in the cable.

In the absence of the polypropylene foam dielectric layer 214, there is nothing immediately supporting center conductor 216. As a result, the center conductor 216 slumps downwards until it is resting on ceramifiable silicone rubber dielectric layer 212. However, due to the layer thickness of ceramifiable silicone rubber dielectric layer 212, center conductor 216 is able to maintain concentricity enough to function and propagate a signal through the coaxial cable. The cable center 222 is now not aligned with the center conductor center 224 of the center conductor 216. The slump distance 220 is the distance the center conductor shifts in a worst-case scenario, measured from the cable center 222 to the center conductor center 224. The brittle structure formed by ceramifiable silicone rubber dielectric layer 212 after it ceramifies is enough to maintain a spacing between the center conductor 216 and the outer conductor, formed from copper layer 210 and copper braiding 208, that the coaxial cable is still able to propagate a signal.

Figure 3:
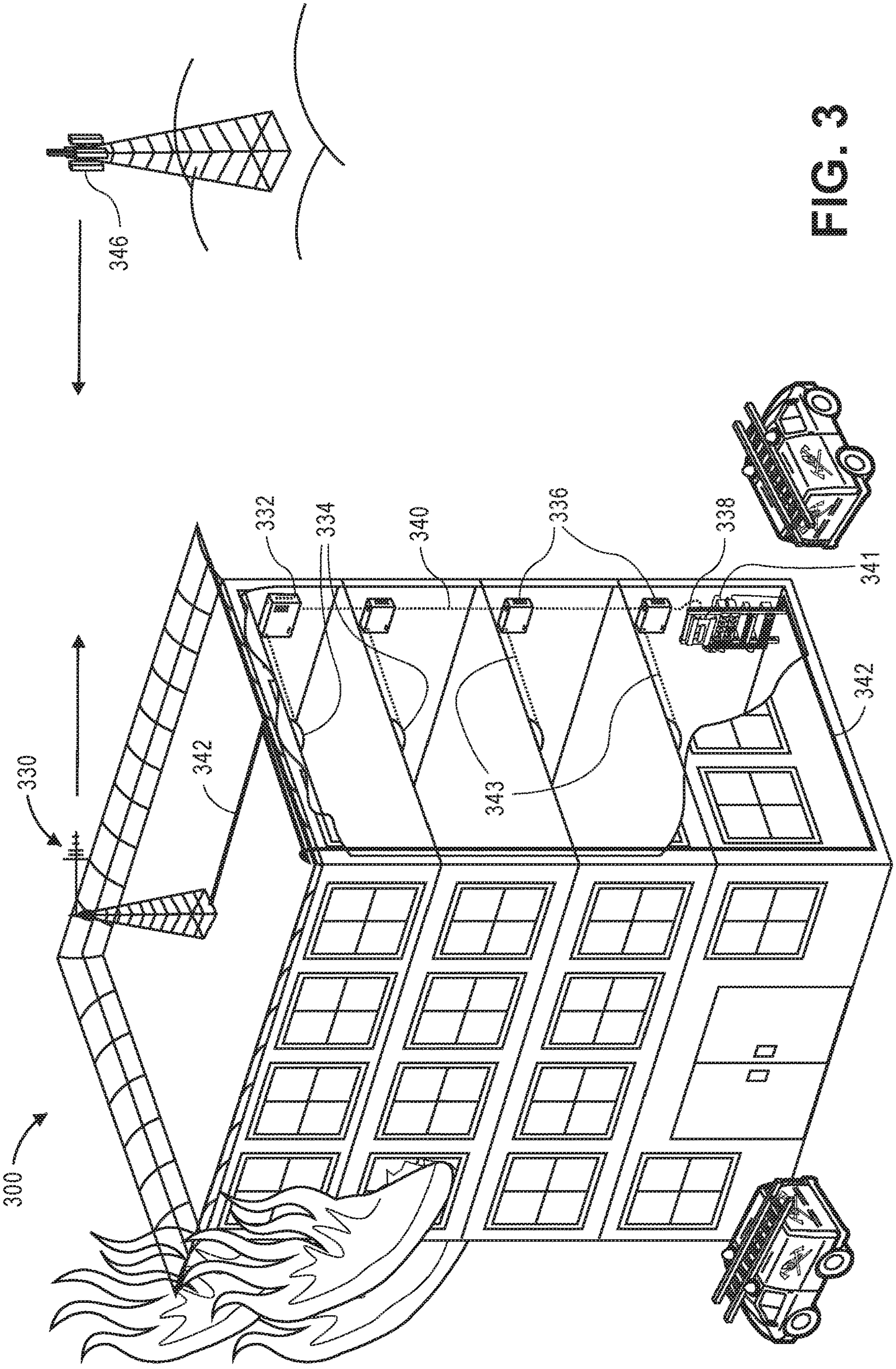
FIG. 3 is an illustration of installed cables in a building distributed antenna system in accordance with an embodiment.

The inner jacket layer 204 has ceramified and provides an external support for the cable. In the absence of plastic sheath layer 206 and flexible film tape substrate 211, the copper layer 210 and copper braiding 208 may also slump slightly, at most until the copper braiding 208 contacts the inner surface of inner jacket layer 204. The inner jacket layer 204 ensures that the copper braiding 208 does not make contact with an external metal object, which could cause an electrical short in the cable. Furthermore, the inner jacket layer 204 providing a porous, brittle structure allows for relative concentricity to be maintained between the copper braiding 208, copper layer 210, and inner conductor 216, the relative concentricity enough to still propagate signal through the coaxial cable. The coaxial cable 200 may maintain an electrical impedance of 50Ω±6Ω even in this slumped position FIG. 3 is an illustration of installed cables in a building distributed antenna system in accordance with an embodiment.

Building 300 has a cellular distributed antenna system (DAS) and/or Emergency Responder Radio Coverage System (ERRCS) DAS installed. A fire resistant coax cable as described above has been pulled or pushed through conduit and affixed inside and outside of the building, connecting to antennae and other systems.

Head-end rack 338 has been installed in an equipment room on the ground floor of building 300. Within head-end rack 338 is housed an optical master unit and other rack-mounted devices. Fiber optic cable 340 connects the head-end rack 338 to remote access units, including optical signal splitters 336 on each floor and remote access unit 332 on the top floor. Optical signal splitters 336 and remote access unit 332 provide the functions of converting and amplifying optical to electrical signals and back again for their respective floor's antenna units. Signal splitters 336 pull off and repeat optical signals from optical cables 340.

On each floor are indoor antennas 334 that wirelessly connect with users' cellular telephones. Antennae 334 are connected to optical signal splitters 336 and remote access unit 332 by coax cables 343, in accordance with an embodiment.

Coax cables 343 are fire resistant in accordance with embodiments herein. Coax cables 343 can maintain operation for over two hours at high temperatures. Therefore, building codes may not require coax cable 343 to be shielded from open air where fire can occur. That is, when using this cable, no additional drywall soffits, fire proof conduit, or other expensive structures may be needed to comply with building codes.

Within the head-end rack 338, fire resistant coax cable 341 can connect different rack-mounted devices. Although the equipment room in which head-end rack is situated may be fire proof, this additional cabling may incrementally harden the system to fire damage.

Fire resistant coax cable 342 runs from head-end rack 338 up the side of the building to roof mounted donor antenna 330. Donor antenna 330 is pointed at local cell tower 346 for an optimal signal.

In operation, communications from end users' cell phones goes to indoor antennae 334 and are then fed to optical splitters 336 through fire resistant coax cables 343. Fiber optic cables 340 bring the communications signals to the head end unit on the ground floor, which then sends the signals through fire resistant coax cable 342 to the roof. At the roof, donor antenna 330 sends the signals from coax cable 342 to cell tower 346. Opposite direction communication signals follow a reverse path.

During a building fire, explosion, or other emergency, coax cables 343, 342, and 341 may be exposed to an inferno of high temperatures. The low smoke zero halogen jacket may burn away. Yet while the insulation of other wires may burn and sublimate and allow their conductors to short out, an embodiment's ceramifiable silicone rubber surrounding the outer conductor largely maintains its form, if not strength and structural integrity. The ceramic matrix from the ceramified silicone rubber does not allow the outer conductor of the coax to electrically short against metal conduit or other wires.

Further, the dielectric, so important in coaxial cables for its impedance and maintaining spacing between an inner conductor and coaxial outer conductor, remains functional in the coaxial cable. While the foam dielectric layer may burn away, the ceramifiable silicone dielectric layer ceramifies under intense heat. Its polysiloxane matrix melts away while inorganic flux particles flow and join refractory particles. This leaves a microporous ceramic material. Although the resulting ceramic material may be brittle, its brittleness should not be an issue because it serves to maintain a spacing between the inner conductor and an outer conductor. By having a ceramifiable silicone layer thickness of greater than 33% of the combined thicknesses of all layers between the center conductor and the outer conductor, the ceramifiable silicone layer is able to keep the center conductor within 67% of its center. The spacing it maintains is enough for the coaxial cable to still get signal out to first responders. At least until first responders can rescue victims and put out the blaze, their communications can depend on the wires.

After the fire is out, the ceramified coax cables may be replaced.

Figure 4:
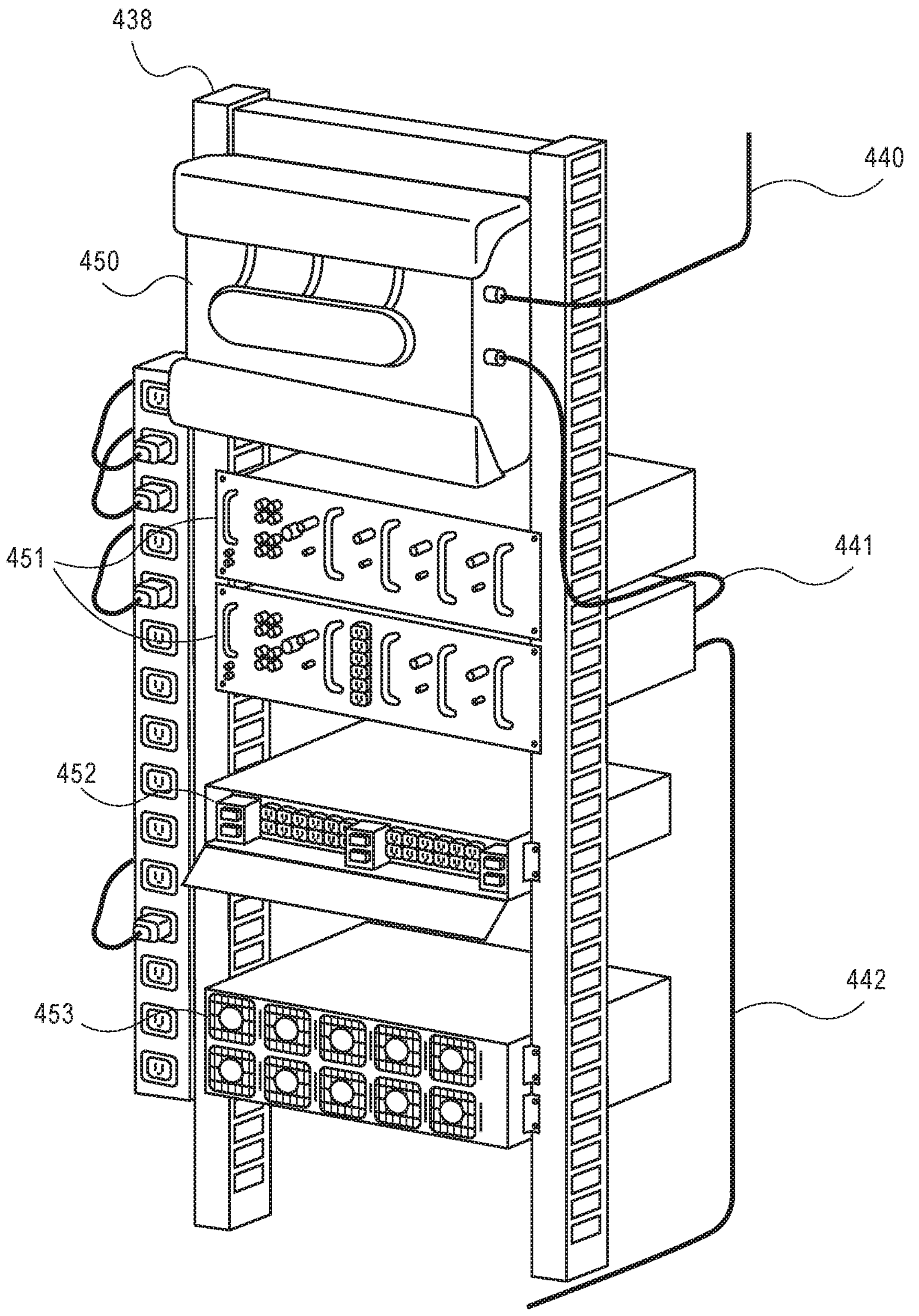
FIG. 4 is an illustration of a central processing rack in accordance with an embodiment.

FIG. 4 illustrates of a central processing rack 438 in accordance with an embodiment. Fiber optic cable 440 extends from optical master unit (OMU) 450 to the DAS field (of indoor antennae). Bi-directional amplifier (BDA) 451 is connected to OMU 450 by fire resistant coax cable 441. Fire resistant coax cable 442 connects BDA 451 to the roof antenna. Uninterruptable power supply (UPS) 452 maintains battery power when power is cut. Power supply 453 supplies electricity during normal, day-to-day operation.

Figure 5:
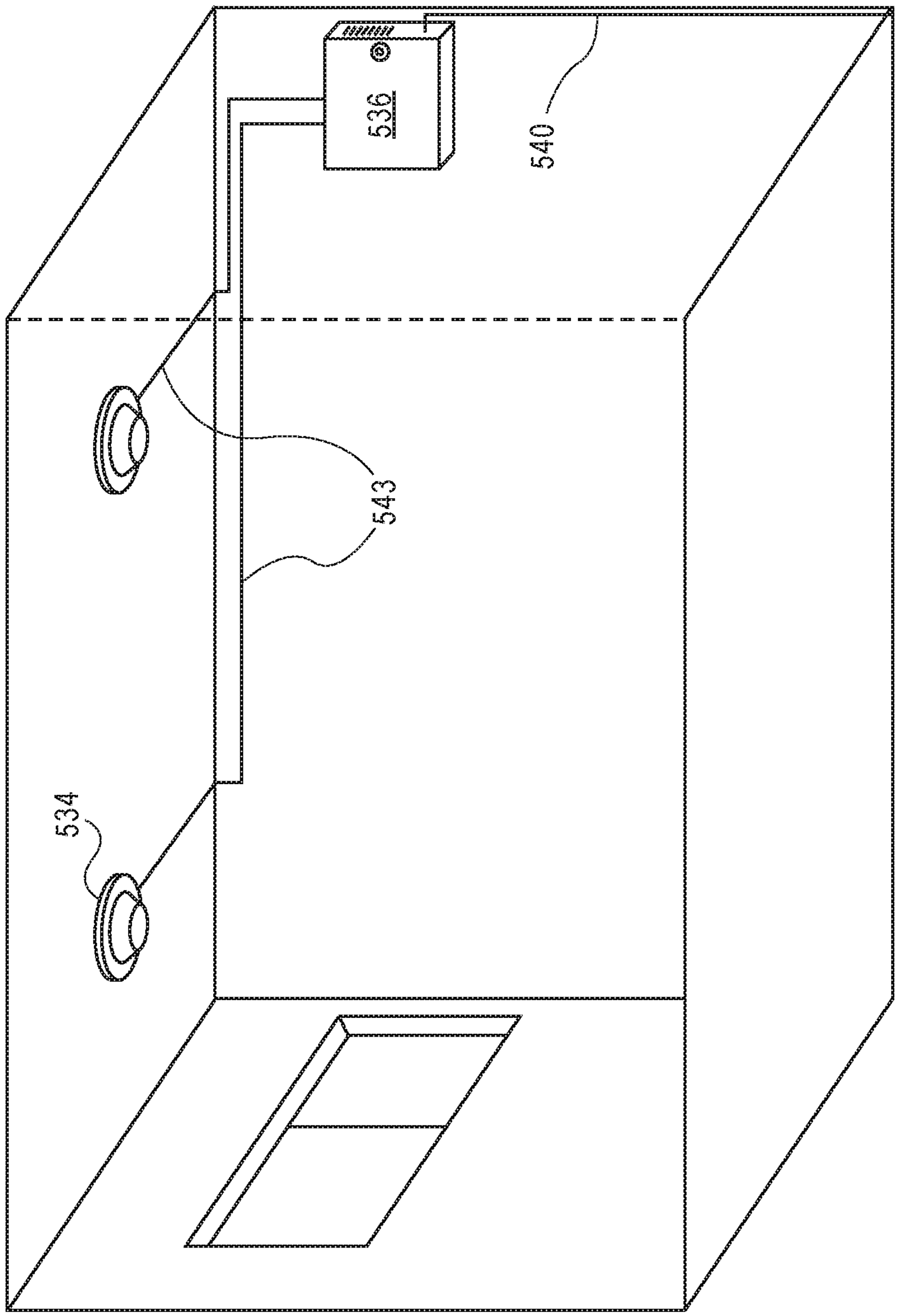
FIG. 5 is an illustration of coax cables connecting distributed antennas to an antenna tap in accordance with an embodiment.

FIG. 5 illustrates fire resistant coax cables connecting distributed antennas to an antenna tap in accordance with an embodiment. Note that the cable may run on the ceiling where the heat may be most intense during a fire. They may be within a false ceiling. Indoor antennae 534 are connected with optical splitter 536 via fire resistant coax cables 543. Fiber optic cable 540 connects optical splitter 536 with the head-end unit.

Figure 6:
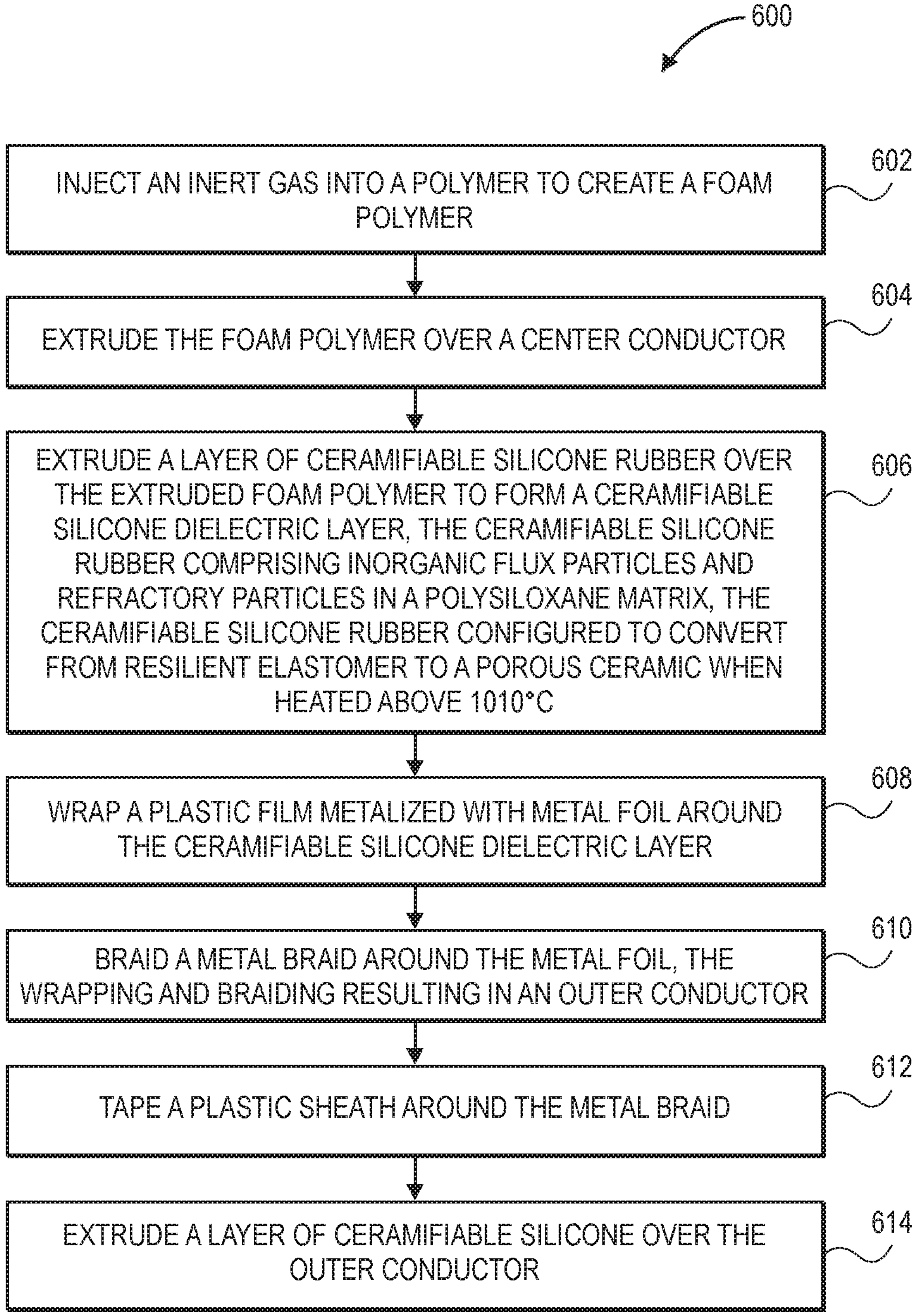
FIG. 6 is a flowchart of a process in accordance with an embodiment.

FIG. 6 is a flowchart of process 600 in accordance with an embodiment. In operation 602, an inert gas, such as nitrogen, is injected into a polymer to create a foam polymer. The polymer may be a common dielectric foam, such as polypropylene, polyethylene, polytetrafluoroethylene, or fluorinated ethylene propylene. In operation 604, the foam polymer is extruded over a center conductor. In operation 606, a layer of ceramifiable silicone rubber is extruded over the extruded foam polymer to form a ceramifiable silicone dielectric layer, the ceramifiable silicone rubber comprising inorganic flux particles and refractory particles in a polysiloxane matrix, the ceramifiable silicone rubber configured to convert from resilient elastomer to a porous ceramic when heated above 1010° C. The ceramifiable silicone rubber can be foamed or unfoamed with nitrogen or other foaming agents. In operation 608, a plastic film metalized with metal foil is wrapped around the ceramifiable silicone dielectric layer. In operation 610, a metal braid is braided around the metal foil, resulting in an outer conductor of the plastic film and the metal braid. In operation 612, a plastic sheath is taped around the metal braid. In operation 614, a layer of ceramifiable silicone is extruded over the outer conductor.

Figure 7:
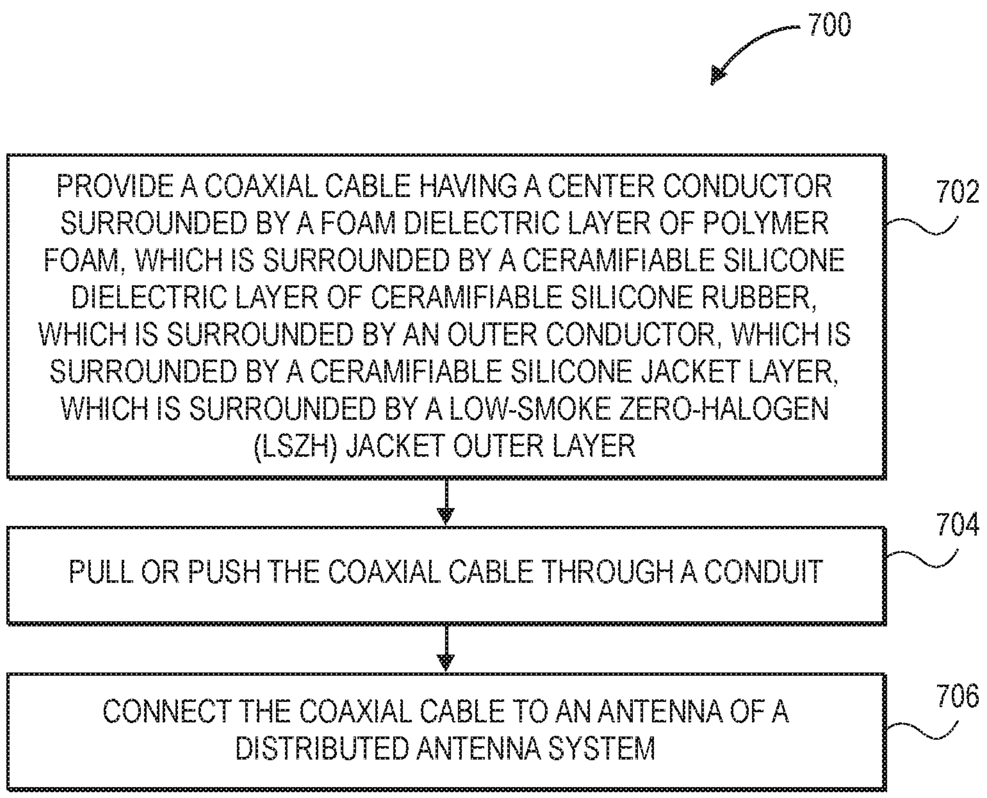
FIG. 7 is a flowchart of a process in accordance with an embodiment.

FIG. 7 is a flowchart of process 700 in accordance with an embodiment. In operation 702, a coaxial cable having a center conductor surrounded by a foam dielectric layer of polymer foam, which is surrounded by a ceramifiable silicone rubber dielectric layer of ceramifiable silicone rubber, which is surrounded by an outer conductor, which is surrounded by a ceramifiable silicone jacket layer, which is surrounded by a low smoke zero halogen outer jacket, is provided. In operation 1002, the coaxial cable is pulled or pushed through a conduit. In operation 1003, the coax cable is connected to an antenna of a distributed antenna system.

Figure 8:
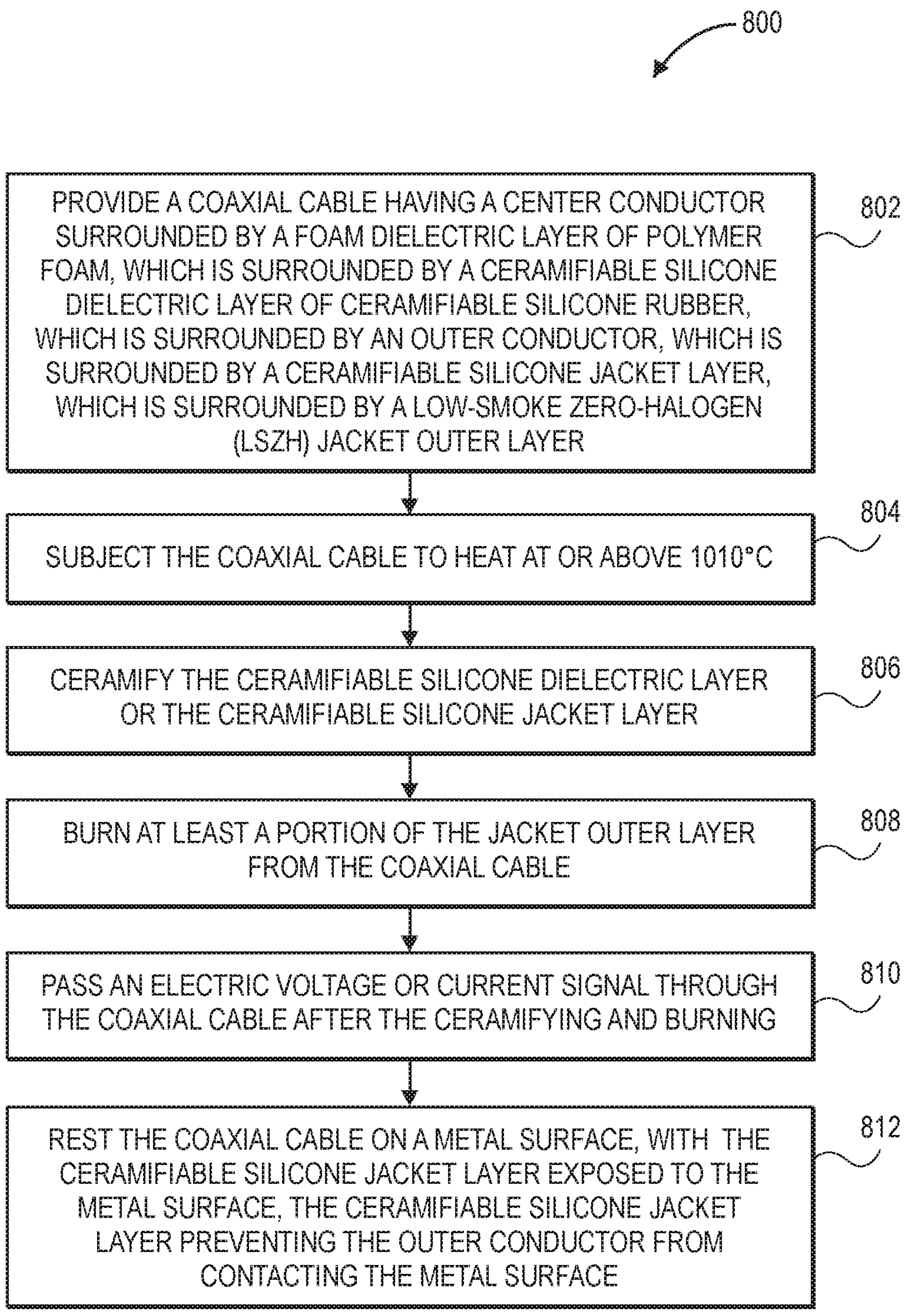
FIG. 8 is a flowchart of a process in accordance with an embodiment.

FIG. 8 is a flowchart process 800 in accordance with an embodiment. In operation 802, a coaxial cable having a center conductor surrounded by a foam dielectric layer of polymer foam, which is surrounded by a ceramifiable silicone dielectric layer of ceramifiable silicone rubber, which is surrounded by an outer conductor, which is surrounded by a ceramifiable silicone jacket layer, which is surrounded by a low-smoke zero-halogen (LSZH) jacket outer layer is provided. In operation 804, the coaxial cable is subjected to heat at or above 1010° C. In operation 806, the ceramifiable silicone dielectric layer or the ceramifiable silicone jacket layer is ceramified. In operation 808, at least a portion of the jacket outer layer from the coaxial cable is burned. In operation 810, an electric voltage or current signal is passed through the coaxial cable after the ceramifying and burning. In operation 812, the coaxial cable is rested on a metal surface, with the ceramifiable silicone jacket layer exposed to the metal surface, the ceramifiable silicone jacket layer preventing the outer conductor from contacting the metal surface.

Although specific embodiments of the invention have been described, various modifications, alterations, alternative constructions, and equivalents are also encompassed within the scope of the invention. Embodiments of the present invention are not restricted to operation within certain specific environments, but are free to operate within a plurality of environments. Additionally, although method embodiments of the present invention have been described using a particular series of and steps, it should be apparent to those skilled in the art that the scope of the present invention is not limited to the described series of transactions and steps.

Further, while embodiments of the present invention have been described using a particular combination of hardware, it should be recognized that other combinations of hardware are also within the scope of the present invention.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A method of manufacturing a fire resistant coaxial cable, the method comprising:

injecting an inert gas into a polymer in order to create a polymer foam;

extruding the polymer foam over a center conductor to form a foam dielectric layer;

extruding a first layer of ceramifiable silicone rubber over the foam dielectric layer to form a ceramifiable silicone dielectric layer, the ceramifiable silicone rubber comprising inorganic flux particles and refractory particles in a polysiloxane matrix, the ceramifiable silicone rubber configured to convert from a resilient elastomer to a porous ceramic when heated above 1010° C.;

encasing the ceramifiable silicone dielectric layer with an outer conductor; and extruding a second layer of ceramifiable silicone rubber over the outer conductor to form a ceramifiable silicone jacket layer.

2. The method of claim 1 wherein the inert gas is 90% or higher grade pure nitrogen.

3. The method of claim 1 wherein the encasing comprises:

wrapping a plastic film metalized with metal foil around the ceramifiable silicone dielectric layer; and braiding a metal braid around the metal foil.

4. The method of claim 3 further comprising:

taping a plastic sheath around the metal braid before extruding the second layer of ceramifiable silicone rubber over the outer conductor.

5. The method of claim 1 wherein the ceramifiable silicone dielectric layer has a thickness of at least 50% of a thickness of the foam dielectric layer.

6. The method of claim 1 wherein the ceramifiable silicone dielectric layer has a thickness of about 55% to 60% of a thickness of the foam dielectric layer.

7. The method of claim 1 wherein the foam dielectric layer has an outer diameter of about 11.7 millimeters, and the ceramifiable silicone dielectric layer has an outer diameter of about 15.2 millimeters±0.51 millimeters.

8. The method of claim 1 wherein the ceramifiable silicone dielectric layer a thickness of greater than 33% of a combined thickness of all layers between the center conductor and the outer conductor, whereby in an event that the foam dielectric layer burns away and no longer supports the center conductor in a center of the fire resistant coaxial cable, the ceramifiable silicone dielectric layer keeps the center conductor within 67% of the center.

9. The method of claim 1 wherein the polymer foam entraps no non-nitrogen gas products.

10. The method of claim 1 wherein the polymer foam is selected from the group consisting of polypropylene, polyethylene, polytetrafluoroethylene, and fluorinated ethylene propylene.

11. The method of claim 1 wherein the ceramifiable silicone dielectric layer is in direct contact with the foam dielectric layer.

12. The method of claim 1 wherein the outer conductor comprises a corrugated metal.

13. The method of claim 1 wherein the outer conductor comprises:

a metal foil; and a metal braid surrounding and in electrical contact with the metal foil.

14. The method of claim 1 further comprising:

surrounding the ceramifiable silicone jacket layer with a low smoke zero halogen (LSZH) outer jacket layer.

15. The method of claim 1 wherein the center conductor comprises a single solid wire or multiple strands of wire.

16. The method of claim 1 wherein the center conductor has a diameter of 5.16 millimeters.

17. The method of claim 1 further comprising:

subjecting the fire resistant coaxial cable to temperatures above 425° C., the ceramifiable silicone dielectric layer and the ceramifiable silicone jacket layer ceramifying, at least a portion of the foam dielectric layer subliming, the center conductor resting directly upon an inner surface of the ceramifiable silicone dielectric layer, and the fire resistant coaxial cable maintaining an electrical impedance of 50 Ω±6Ω.

* * * * *